US007232176B1

(12) United States Patent
Dopwell

(10) Patent No.: US 7,232,176 B1
(45) Date of Patent: Jun. 19, 2007

(54) ALL VISION

(76) Inventor: Patrick Dopwell, #2 Eight Street West, Five Rivers, Arouca, Trinidad (TT)

( * ) Notice: Subject to any disclaimer, the term of this patent is extended or adjusted under 35 U.S.C. 154(b) by 0 days.

(21) Appl. No.: 11/390,044

(22) Filed: Mar. 27, 2006

(51) Int. Cl.
*B60J 3/00* (2006.01)

(52) U.S. Cl. ............... 296/97.9; 296/97.1; 160/370.22; 160/310; 160/23.1

(58) Field of Classification Search ............... 296/97.1, 296/97.4, 97.7, 97.8, 97.9; 160/370.22, 310, 160/23.1, 265, 274
See application file for complete search history.

(56) References Cited

U.S. PATENT DOCUMENTS

2004/0040676 A1* 3/2004 Engl et al. ............. 160/370.22
2004/0056504 A1* 3/2004 Hattass et al. ............. 296/97.1
2005/0264022 A1* 12/2005 Suzuki et al. ............. 296/97.4

FOREIGN PATENT DOCUMENTS

WO WO2004/060704 7/2004
WO WO2005/021304 3/2005

* cited by examiner

*Primary Examiner*—Lori L. Lyjak
(74) *Attorney, Agent, or Firm*—Michael I Kroll

(57) ABSTRACT

The all vision visor is an extendable retractable polarized sun visor that utilizing a prism and light source that is rotative relative to a housing slot whereby the user can vary the color wavelength projected into the sun visor that refracts incoming sun rays, while allowing full vision through the windshield from the interior of the automobile.

14 Claims, 10 Drawing Sheets

ALL VISION

BACKGROUND OF THE INVENTION

1. Field of the Invention

The present invention relates generally to sun visors and, more specifically, to a polarized sun visor to refract sun glare and a prism of light to impinge a user desire color into the sun visor providing a sun visor having a selected hue of color.

Sun glare on windshields of motor vehicles causes visual impairment to the driver. The present invention Overcomes the problem of sun glare by providing a polarized sun visor and prism of light that refracts incoming sun rays, while allowing full vision through the windshield from the interior of the automobile.

The present invention a prism light sun visor is powered electrically through the automobiles auxiliary power and is activated upon ignition of the motor vehicle providing protection from external light while allowing full vision from the interior of the motor vehicle.

Additionally, the present invention a prism light sun visor provides functional use for night time use. Under night conditions the prism of light acts as a light source providing means for soft illumination from within the automobile and allowing improved visibility to other motorist. The present invention also provides and on off switch for selectively engaging and disengaging the prism of light.

Furthermore, the present invention a prism light sun visor provides means for varying the color spectrum. By varying the color, the prism of light also provides artistic and/or personnel effect.

An additional element of the present invention a polarized prism of light sun Visor can be used to refract the sun glare on the side window of the motor vehicle. The electronic light system may be utilized to protect any one window or multiple windows from external light while allowing full vision from the interior of the motor vehicle.

2. Description of the Prior Art

There are other visor devices designed for windows. Typical of these is International Patent Application No. WO 1998/57214 published to DeSchrijver on 17 Dec. 1998.

Another patent was issued to Mancebo on 16 Dec. 1999 as International Patent Application No. WO 1999/64263. Yet another International Patent Application No. WO2001/89789 was issued to Esteban on 29 Nov. 2001 and still yet another was published on 20 Sep. 2001 to Sabrido as International Patent Application No. WO2001/68396.

Another patent was issued to Davey, et al. on 6 Feb. 2003 as International Patent Application No. WO2003/010020. Yet another International Patent Application No. WO2003/081565 was published to McCartney on 2 Oct. 2003. Another was published to Naik on 22 Jul. 2004 as International Patent Application No. WO2004/060704 and still yet another was published on 10 Mar. 2005 to Morris as International Patent International Patent Application Number WO 1998/57216

Inventor: Stefaan DeSchrijver

Published: Dec. 17, 1998

A sun visor in a vehicle (such as an automobile) includes a computer display to display data generated by a computer remotely located within the vehicle. The display is preferably a liquid crystal display which may be outfitted with a touch sensitive screen. The display may alternatively be provided in the dashboard of the vehicle. Peripheral devices such as a printer and/or a card reader may also be provided. The inventive display is particularly suited for use in a police environment.

International Patent Application Number WO 1999/64263

Inventor: Antonia M. Mancebo

Published: Dec. 16, 1999

Motor-actuated sun visor applicable to motor vehicles, consisting of a parallelepiped receptacle inside which is incorporated a vitreous tabular body capable of sliding internally and enabling the extrusion thereof to different extents. The sun visor has a flap (5) situated in the medial area of its major side and is made of material sheet having high reflection characteristics to incident rays coming from the outside. The extraction or introduction of the vitreous tabular body is performed manually or by means of a conventional electric motor configured as an electric power supplied mechanism (4).

International Patent Application Number WO2001/89789

Inventor: Miguel A. S. Estaban

Published: Nov. 29, 2001

The invention relates to a method for producing blow-moulded sun visors comprising outer surfaces with a preferred embodiment. The outer surface of the sun visor varies in colour, surface structure and roughness. An economically-produced sun visor can thus be obtained to match the interior fittings of any motor vehicle. The structure and roughness of the outer surface of the sun visor are complementary to the inner surfaces (4) of the blow mould (1, 1'). The colour of the outer surfaces of the sun visor is also adjusted according to the Coloration of the polypropylene used (2). Said coloration is obtained from organic and inorganic pigments. The invention also relates to a zip-up material cover for sun visors, which can easily be taken off and changed as required. The zip is almost completely covered by the hem and therefore cannot be seen by the passengers in the vehicle.

International Patent Application Number WO2001/68396

Inventor: Miguel A. S. Estaban

Published: Sep. 20, 2001

The invention relates to flocked sun-visors which vary in colour, nature, structure, tactile sensation and appearance and to a method for producing the same. The variable surface treatment of the sun-visors and their customization to the interior trim of a motor vehicle is achieved by the applied filaments which can vary in material, shape, composition and colour. According to the method for producing flocked sun-visors, sun, visor bodies comprising a hard, smooth surface, preferably blow-moulded sun-visor bodies consisting of plastic are coated with adhesive and subsequently flocked by electrostatic action. In comparison to conventional methods for producing sun-visors with a pleasing appearance, said method is less expensive and less time-consuming. The method comprises five steps: cleaning, priming, coating with adhesive, flocking and curing.

International Patent Application Number
WO2003/010020

Inventor: Geoffrey W. Davey, et al

Published: Feb. 6, 2003

A sun visor assembly for an automotive vehicle includes a sun visor panel having generally planar opposing sides sandwiched together to define a pocket therebetween. A longitudinally extending support rod is positioned between the opposing sides of the panel for supporting the panel in the interior of the vehicle. An adjustment mechanism is coupled between the support rod and the sun visor panel for providing selective sliding movement of the sun visor panel for providing selective sliding movement of the sun visor panel along the support rod between a retracted position and an extended position. The adjustment mechanism includes a support frame secured to the visor panel having an upper rail forming a longitudinal rack, a guide carriage secured to the support rod and slidably coupled to the support frame, and a gear rotatable supported by the carriage and meshed with the rack for guiding the sun visor panel along the support rod between the retracted and extended positions.

International Patent Application Number
WO2003/081565

Inventor: Jan McCartney

Published: Oct. 2, 2003

A portable illuminated sign for attachment to a vehicle sun visor, comprising first and second parts (12 and 13) enclosing an array of LEDs (15) connectable, via a circuit board (16) and power lead (20), to a cigar lighter socket of a vehicle. The sign may thus display an illuminated legend and be readily mounted by clip (14) on the visor to be seen through the vehicle window.

International Patent Application WO2004/060704

Inventor: Sanjeev Naik

Published: Jul. 22, 2004

An automatic sun visor system for a vehicle includes a light detecting apparatus for detecting sunlight incident upon the face of an occupant of the vehicle. A microcontroller receives a control signal from the light detecting apparatus, and an adjustable sun visor receives a darkening control signal from the microcontroller. The darkening control signal activates the adjustable sun visor in response to the degree of sunlight detected.

International Patent Application Number
WO2005/021304

Inventor: Donald F. Morris

Published: Mar. 10, 2005

The invention relates to an accessory for a motor vehicle visor which includes a tinted, transparent sheet element and mounting means whereby it can be mounted on a vehicle visor. In its mounted configuration on a vehicle visor it is displaceable between a first position, in which it is located within the perimeter of the visor, and a second position, in which it extends from the edge of the visor remote from the edge about which the visor is pivotally displaceable. With the visor in its operative configuration and the sheet element in its second position, the sheet element can serve to shield a vehicle driver's eyes against the rays of a low setting sun, a rising sun and oncoming vehicle headlights, while visibility through and around the sheet element still permits clear road visibility.

While these sun visor devices may be suitable for the purposes for which they were designed, they would not be as suitable for the purposes of the present invention, as hereinafter described.

SUMMARY OF THE PRESENT INVENTION

A primary object of the present invention is to provide a polarized sun visor and prism of light to refract sun glare in a motor vehicle.

Another object of the present invention is to provide a polarized sun visor and prism of light that refracts incoming sun glare while allowing full vision through the windshield from the interior of the automobile.

Yet another object of the present invention is to provide a polarized sun visor and prism of light that is powered electrically through the automobiles auxiliary power.

Another object of the present invention is to provide a polarized sun visor and prism of light that is activated upon ignition of the motor vehicle.

Still yet another object of the present invention is to provide a polarized sun visor and prism of light that includes functional use for night time use.

Another object of the present invention is to provide a polarized sun visor and prism of light that under night conditions the prism of light acts as a light source providing means for soft illumination from within the automobile and allowing improved visibility to other motorist.

Yet another object of the present invention is to provide a polarized sun visor and prism of light that provides means for varying the color spectrum and emitting a user selected band into the sun visor.

Still yet another object of the present invention is to provide means to refract the sun glare on the side window of the motor vehicle.

Additional objects of the present invention will appear as the description proceeds. The present invention overcomes the shortcomings of the prior art by providing a polarized light visor and prism of light that refracts incoming sun rays, while allowing full vision through the windshield and/or other window from the interior of the automobile.

The foregoing and other objects and advantages will appear from the description to follow. In the description reference is made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

LIST OF REFERENCE NUMERALS

Figure 1:
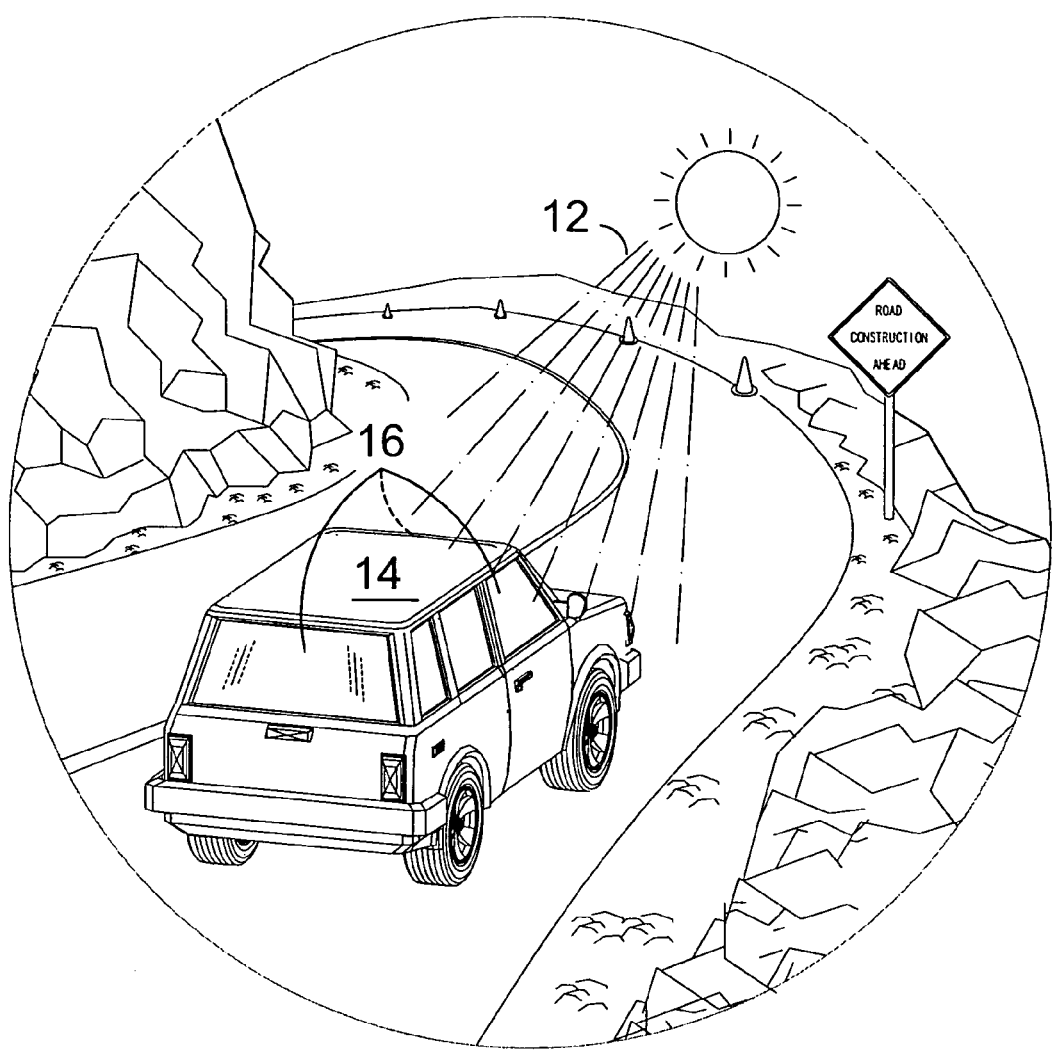
FIG. 1 is an illustrative view of prior art.

With regard to reference numerals used, the following numbering is used throughout the drawings.
10 present invention
12 sun beams
14 motor vehicle
15 electrical communication
16 glass
18 windshield
19 user
20 fastener
21 housing
22 polarized visor
24 motor
25 housing slot
26 interior housing
27 color selector switch
28 exterior housing
29 color selector pivot
30 prism
31 light box
32 light source
33 beam
34 refractive light
36 wavelength
38 filtering element
40 filtering element switch
42 first filtering element
44 nth filtering element
48 method of filtering
50 visor track
52 cable drive

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

Referring to FIG. 1, shown is an illustrative view of prior art. Sun glare on windshields of motor vehicles causes visual impairment to the driver. The present invention overcomes the problem of sun beams 12 by providing means for blocking sun glare and means for selectively illuminating the sun blocking means using a polarized sun visor and prism of light that refracts incoming sun beams 12 at glass 16 of motor vehicle 14 having the present invention installed therein over any window that the user wants reduction of sunglare.

Figure 2:
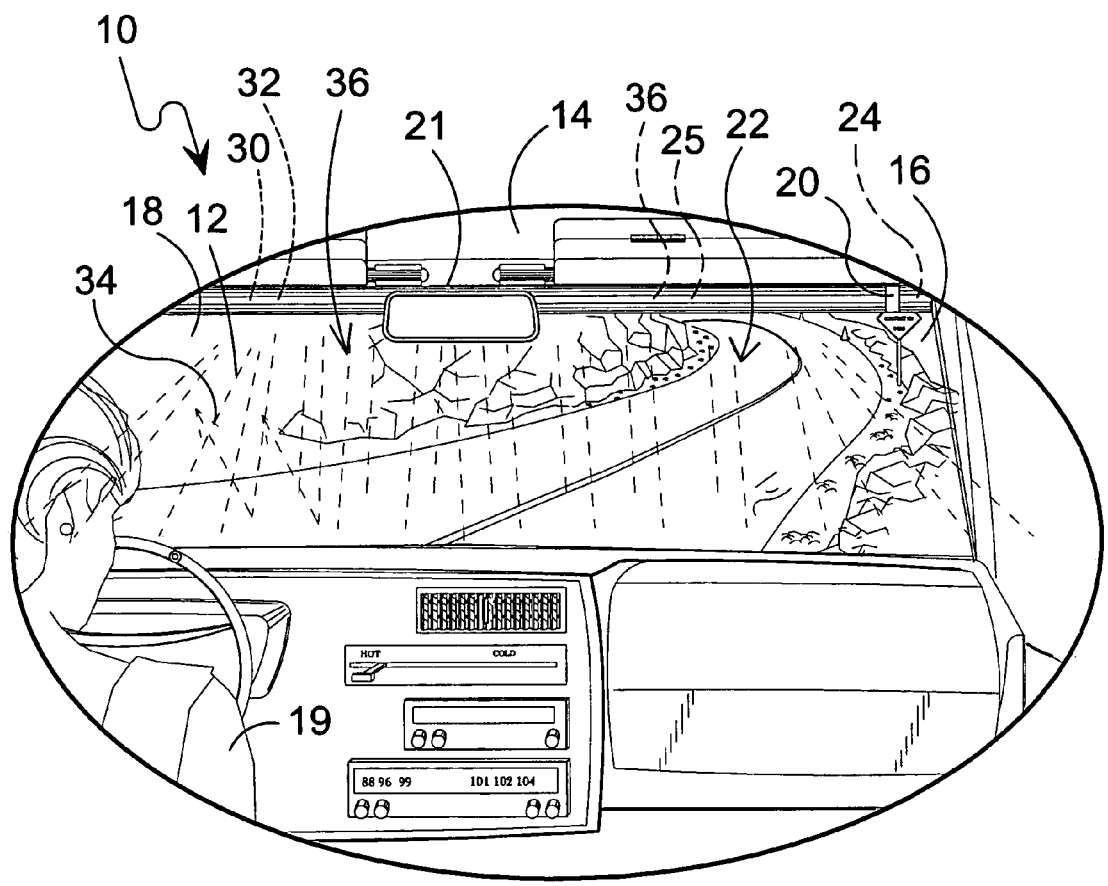
FIG. 2 is an illustrative view of the present invention, an electronic light system, in use.

Referring to FIG. 2, shown is an illustrative view of the present invention, an electronic visor and color generator. Depicted is the present invention 10 that is activated upon ignition of the motor vehicle 14 providing protection from sun beams 12 while allowing full vision from the interior of the motor vehicle 14. The present invention 10 is comprised of a housing 21, extendable retractable sun visor 22, integral prism 30 and light source 32 fixed to the housing proximate housing slot 25. The apparatus is fixed to motor vehicle 14 over user selected glass 16 using appropriate fastener 22 and in electrical communication 15 with the vehicle ignition system whereby said present invention 10 motor 24 is preferably energized upon vehicle ignition. Located within housing 21 is one or more illuminable light source 32 for generating a waveform that is filtered through prism 30 emitting a visible spectrum whereby one selected waveform of a desired color is projected into polarized sun visor 22 positioned over glass 16 of motor vehicle 14 refracting light 34 of sun beam 12. Additionally, the present invention provides for selectively varying the color projected into sun visor 22 through manipulation of a color selector switch, which rotates prism 30 until a desired color of prism generated light beams 36 is impinged into sun visor 22.

Figure 3:
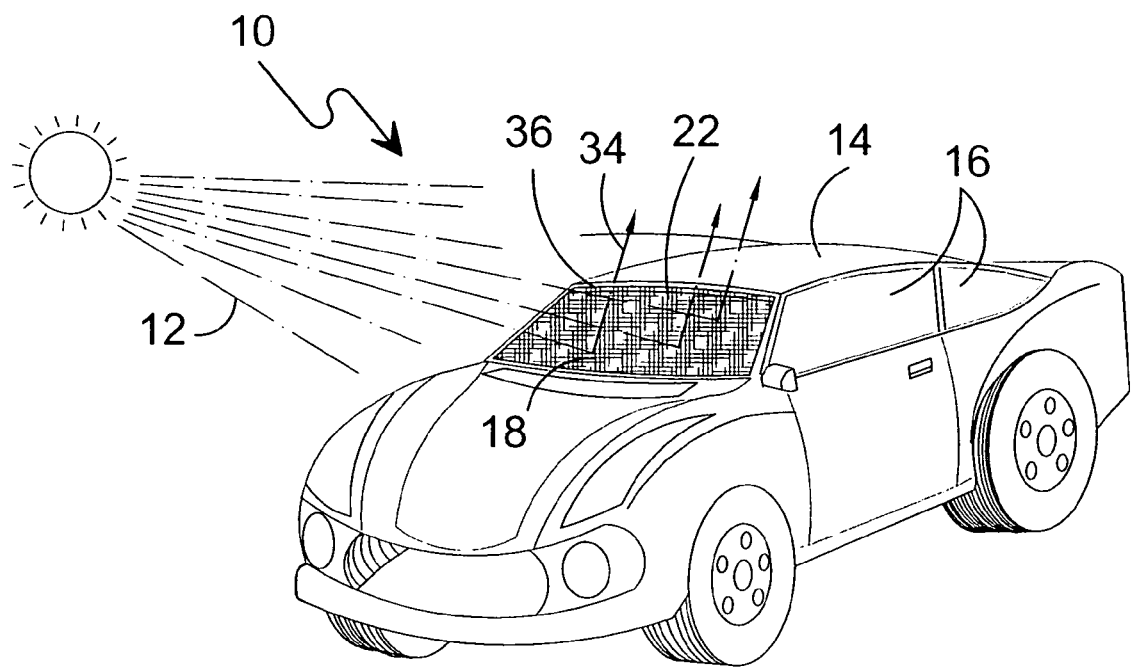
FIG. 3 is a perspective view of the present invention.

Referring to FIG. 3, shown is a perspective view of the present invention. Depicted is the all vision visor that acts as a sun visor by providing means to refract the sun beams 12 on the windshield 18 of the motor vehicle 14.

The present invention 10 is preferably activated upon ignition of the motor vehicle whereupon polarized sun visor 22 having a user selected prism generated light beams 36 refracts light 34 of sun beam 12 from glass 16, 18 of motor vehicle 14 therein providing protection from external light while allowing full vision from the interior of the motor vehicle.

Figure 4:
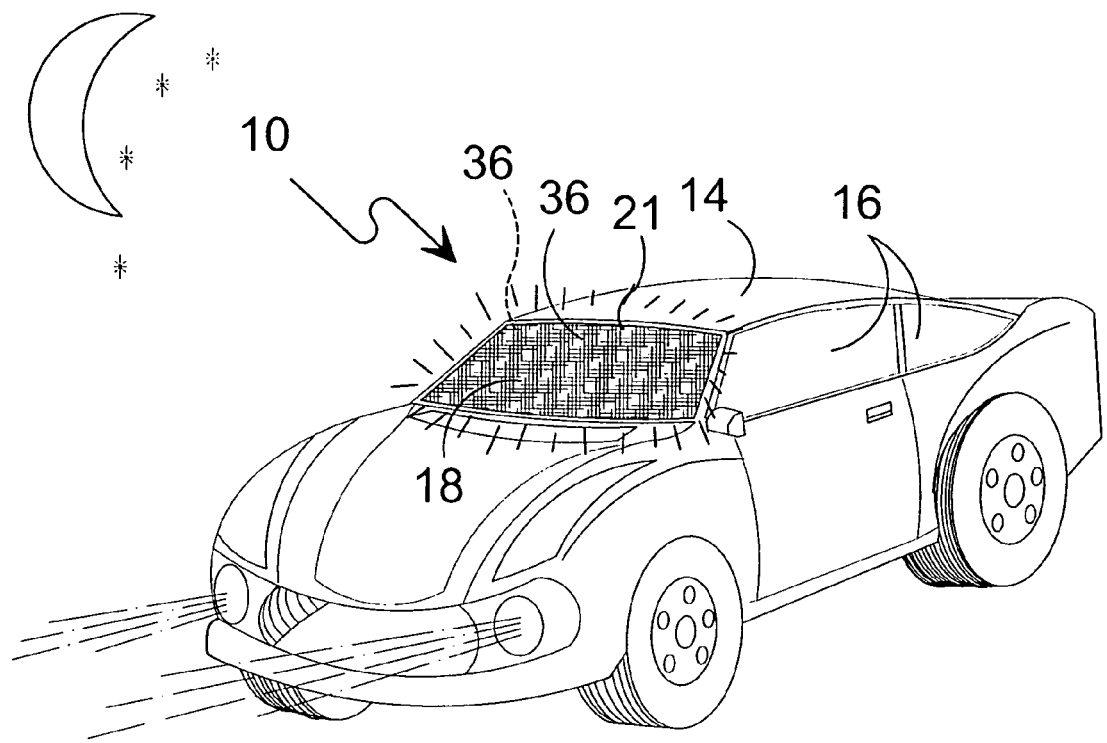
FIG. 4 is a side view of the present invention.

Referring to FIG. 4, shown is a side view of the present invention. Depicted is present invention 10 comprised of a housing 21 fixed to motor vehicle 14 over a user selected window using appropriate fasteners and in electrical communication with the vehicle ignition system whereby said present invention 10 is preferably energized upon vehicle ignition. Located within housing 21 is deployable polarized sun visor 22 and illuminable light source 32 for generating a waveform through a prism to split the light source into specific colors with means incorporated for selecting a desired prism generated light beams 36 and impinging said color into sun visor 22. Under night conditions the prism generated light beams 36 provides means for soft illumination from within the automobile and allows improved visibility to other motorist. The present invention also provides and on off switch for selectively engaging and disengaging the prism of light.

Figure 5:
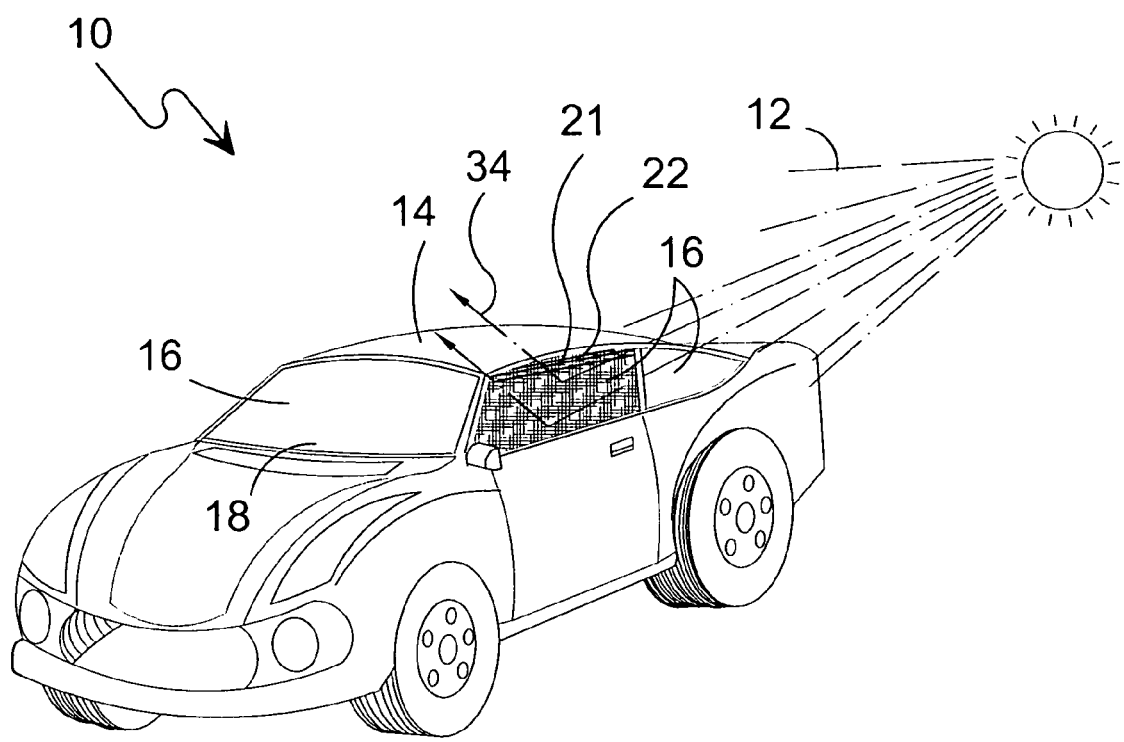
FIG. 5 is an illustrative view of the present invention, an electronic light system, in use.

Referring to FIG. 5, shown is an illustrative view of the present invention in an alternate location. Depicted is the present invention 10 that is activated upon ignition of the motor vehicle 14 providing protection from sun beams while allowing full vision from the interior of the motor vehicle 14. The present invention 10 is comprised of housing 21 having an extendable retractable sun visor 22 fixed to motor vehicle 14 over user selected glass 16 using the appropriate fastener and in electrical communication with the vehicle ignition system whereby the present invention 10 is preferably deployed upon vehicle ignition. Located within housing 21 is one or more illuminable elements for generating a waveform that is filtered through a prism emitting a visible spectrum whereby one selected waveform of a desired color is projected into polarized sun visor 22 positioned over glass 16 of motor refracting light 34 of sun beam 12. Additionally, the present invention provides for selectively varying the color projected into sun visor 22 through manipulation of a color selector switch, which rotates the prism until a desired color is impinged into sun visor 22.

Figure 6:
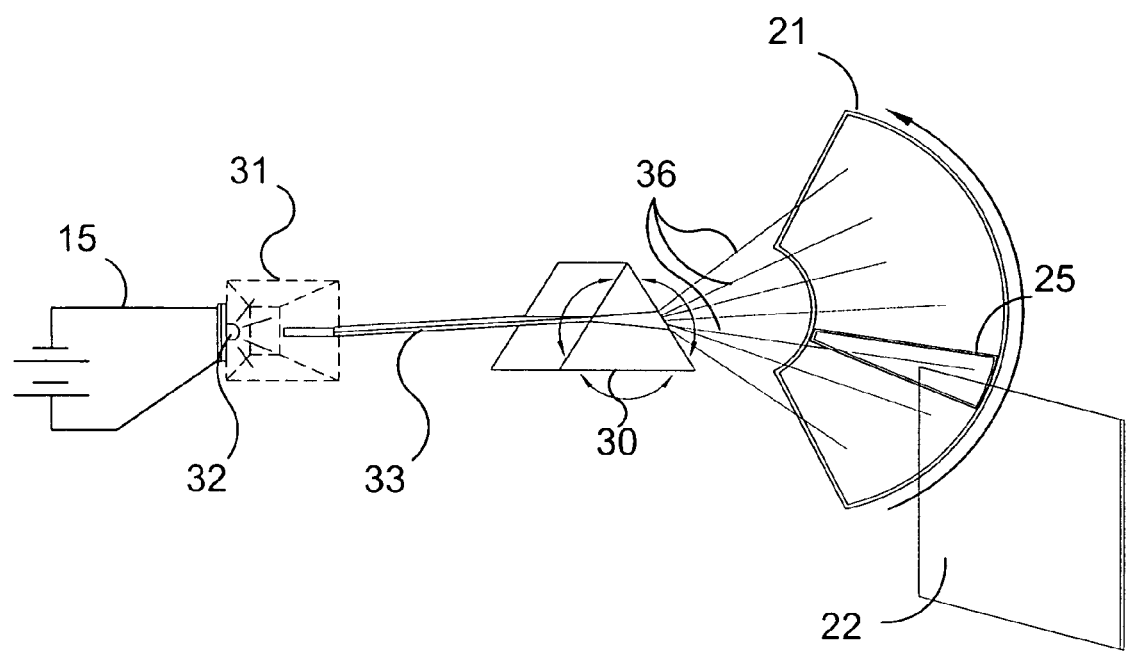
FIG. 6 is an illustrative view of the present invention, an electronic light system, in use.

Referring to FIG. 6, shown is an illustrative view of the present invention in operation. Upon vehicle ignition, the present invention 10 having electrical communication 15 therewith energizes the deployment of sun visor 22 from within housing 21 through housing slot 25 and energizes light source 32 within light box 31 to emit beam 33 into prism 30 that splits into prism generated light beams 36, which is selectively directed into polarized sun visor 22 at housing slot 25.

Figure 7:
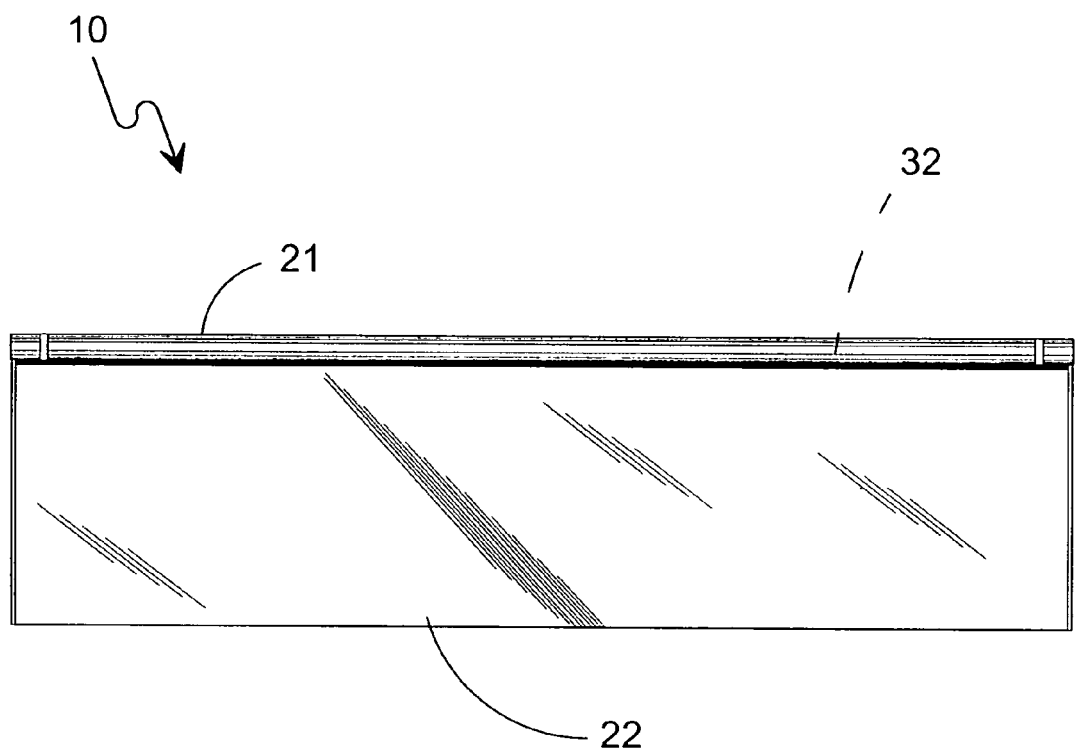
FIG. 7 is a cross section view of the present invention.

Referring to FIG. 7, shown is the all vision sun shield of the present invention. The present invention 10 overcomes the problem of sun glare by providing means for blocking sun glare and means for selectively illuminating the sun blocking means using a polarized sun visor 22 extending from housing 21 along visor tracks 50 and using a prism to split a beam into a color spectrum that is impinged upon polarized sun visor 22, which at night will provide soft illumination from within the automobile and allows improved visibility to other motorist. The present invention also provides and on off switch for selectively engaging and disengaging the prism of light, of light that refracts incoming sun beams 12 at glass 16 of motor vehicle 14 having the present invention installed therein over any window that the user wants reduction of Sun glare.

Figure 8:
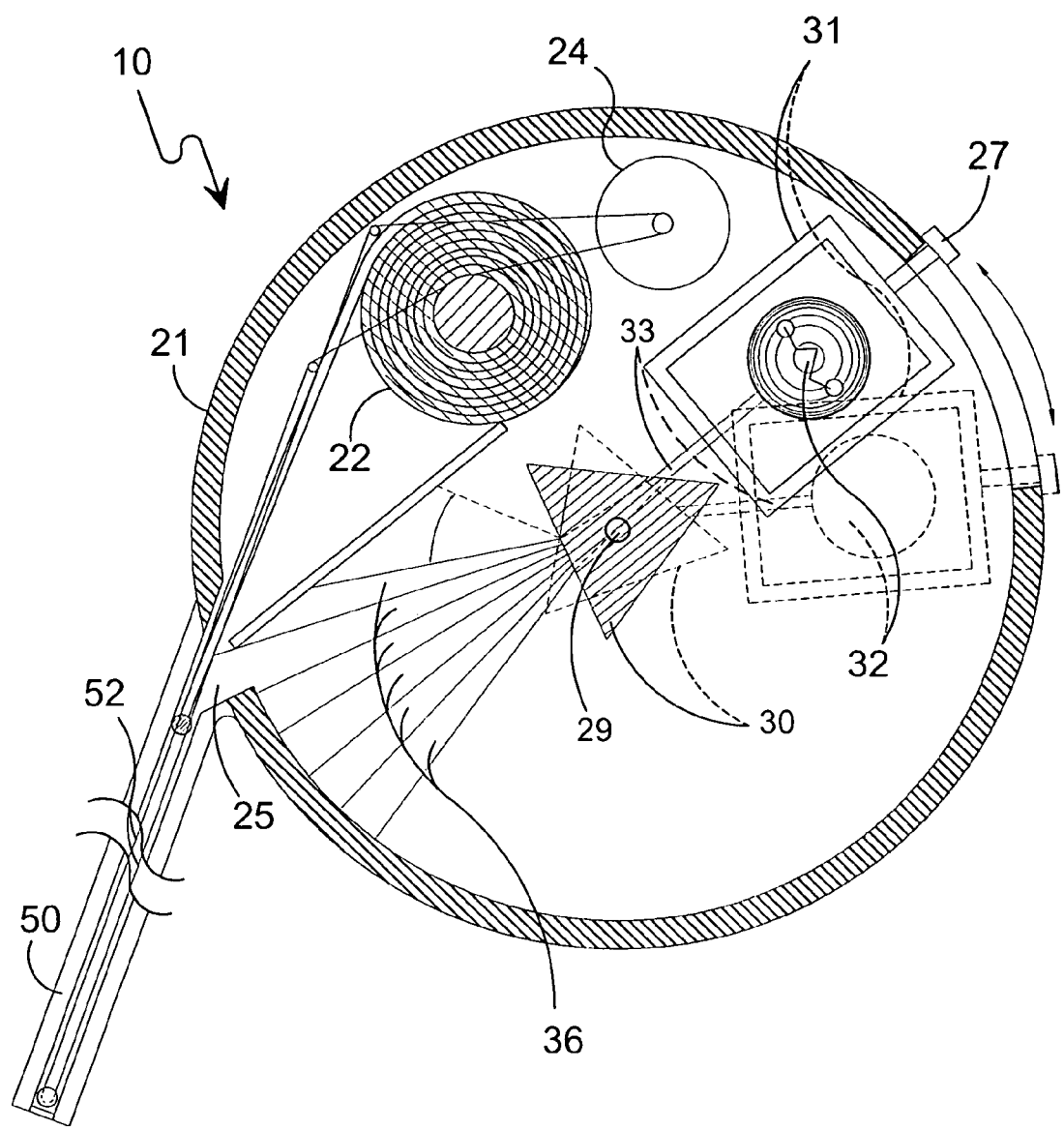
FIG. 8 is an illustrative view of the present invention, an electronic light system, in use.

Referring to FIG. 8, shown is an illustrative view of the present invention comprising an all vision sun visor. Depicted is housing 21 having a housing slot 25 through which polarized sun visor 22 extends along visor track 50 preferably upon vehicle ignition using energized motor 24 and cable drive 52. Also shown is prism 30 in communication with light box 31 and integral light source 32 emitting beam 33 that is split into prism generated light beams 36 with each of said prism generated light beams 36 alignable with housing slot 25 emitting desired prism generated light beams 36 into polarized sun visor 22 resulting in polarized sun visor 22 having a desired color equating to whichever prism generated light beams 36 is aligned with housing slot 25. Prism 30 fixed to light box 31 is pivotable about color select pivot 29 using color selector switch 27 whereby the user can selectively align a desire colored prism generated light beams 36 with housing slot 25. As aforementioned, the present invention 10 is comprised of housing 21 that is fixed to motor vehicle 14 over user selected glass 16 using appropriate fastener 22 and in electrical communication with the vehicle ignition system whereby said apparatus is preferably energized upon vehicle ignition. Located within the housing is one or more illuminable elements for generating a waveform that is filtered through prism 30 into glass 16 of motor vehicle 14.

Figure 9:
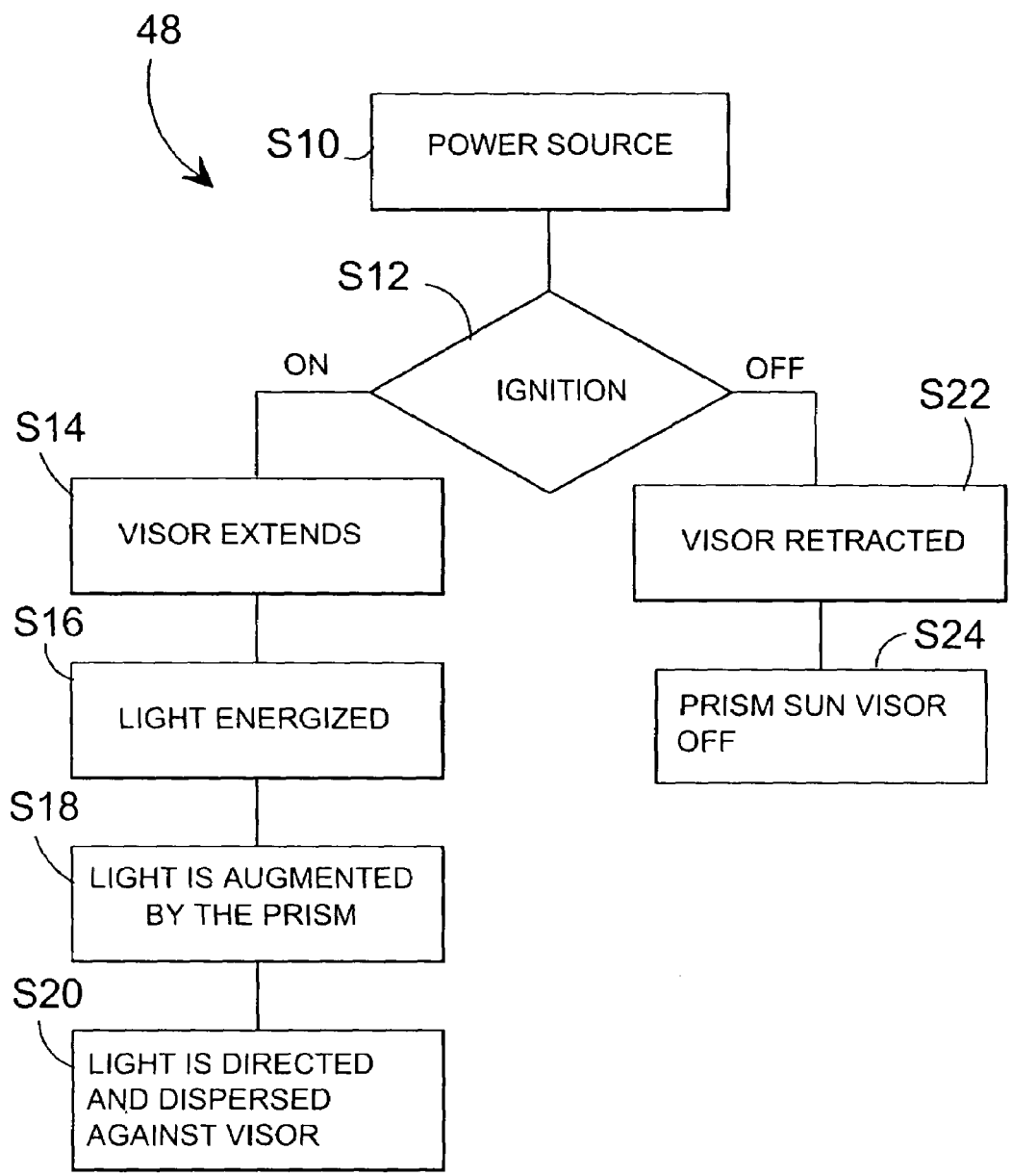
FIG. 9 is a flow chart of the present invention.

Referring to FIG. 9, shown is a flow chart of the all vision sun visor. The flow chart depicts the modes and method of filtering 48. Comprising the present invention. In Step S10, the vehicle power source is engaged through ignition of the motor vehicle, as shown in Step S12 to deploy the visor as shown in Step S14. In addition to deploying the all vision visor the light source is energized, as shown in Step S16, generating a beam that is projected into a prism to split the beam into color bands, as stated in Step S 8, and impinged upon the visor through the housing slot, as stated in Step S20. When the vehicle ignition is turned off, the visor is retracted, as stated in Step S22 and the light source is de-energized as stated in Step S24.

Figure 10:
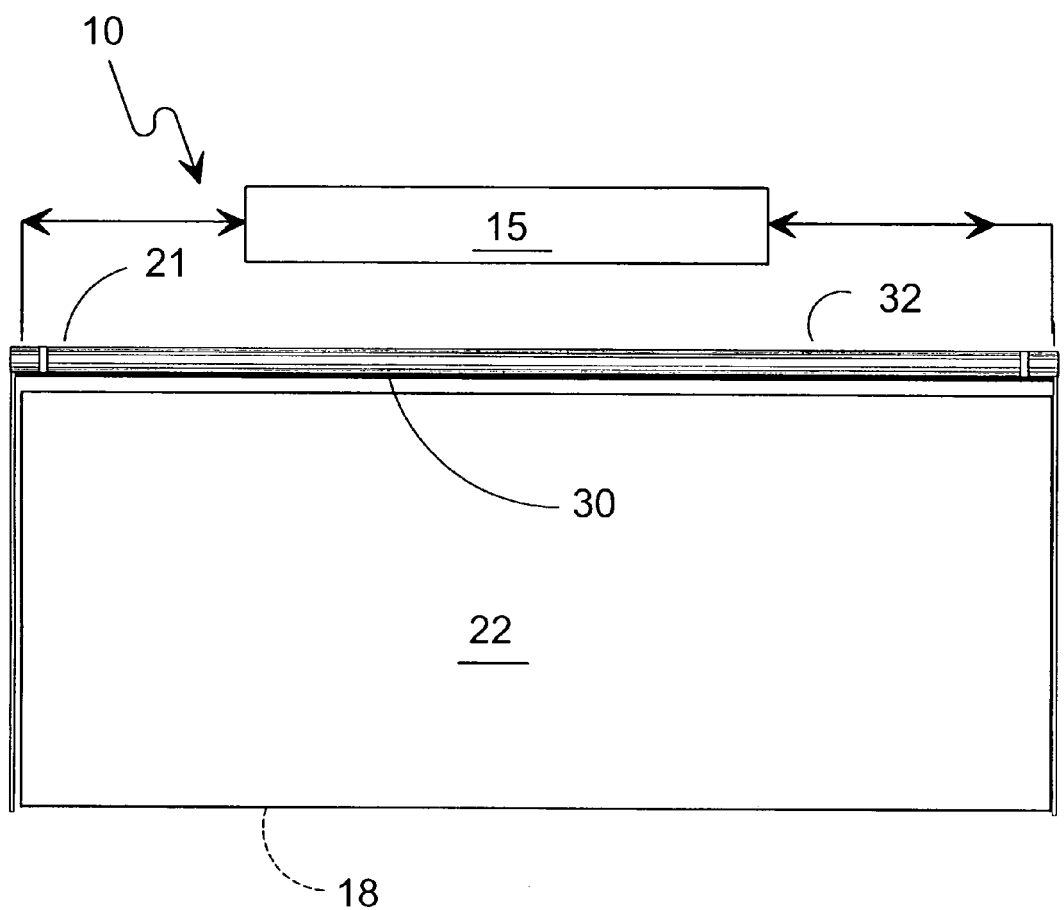
FIG. 10 is an illustrative view of all vision sun shield of the present invention.

Referring to FIG. 10, shown is a front view of the present invention. Shown is the present invention 10 having a housing 21 with a light source 32 that is directed through a Prism 30 to produce a desired and functional wave length and color of prism generated light beams 36 used for the purposes of providing color shaded regions during the day and illuminated effects during the night for a driver. The present invention 10 is comprised of a housing 21 and integral prism 30 fixed to the housing proximate housing slot 25. The apparatus is fixed to motor vehicle 14 over user selected glass 16 using appropriate fastener 22 and in electrical communication 15 with the vehicle ignition system whereby said apparatus is preferably energized upon vehicle ignition.

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed to be new and desired to be protected by Letters Patent is set forth in the appended claims.

I claim:

1. An apparatus comprising a sun visor for attachment to the interior roof of a motor vehicle approximate a vehicle window, comprising:
    a) a housing having an interior surface and an exterior surface with a slot extending therebetween;
    b) mounting means within said housing for attachment to the vehicle interior proximate to a selected window;
    c) an extendable retractable polarized sun visor located within the housing that extends when the vehicle ignition is engaged and retracts when the vehicle ignition is disengaged;
    d) an illuminable member located within the housing compartment formed by the interior housing surface and in electrical communication with a power source for energizing said apparatus; and,
    e) a prism depending from said illuminable member whereby said illuminable member when energized will generate a waveform that passes into the prism.

2. The apparatus of claim 1, wherein said fastening element is releasable.

3. The apparatus of claim 2, wherein said fastening element comprises adhesive.

4. The apparatus of claim 3, wherein said fastening element comprises a peel-off adhesive backing.

5. The apparatus of claim 4, wherein said housing is in electrical communication with the motor vehicle ignition system that when energized will energize the housing illuminable member.

6. The apparatus of claim 5, further comprising an illuminable member positioned within said housing and in electrical communication with said vehicle electrical system.

7. The apparatus of claim 6, wherein said illuminable member is illuminated upon starting the motor vehicle.

8. The apparatus of claim 7, further comprising a switch for disengaging the sun visor of the present invention.

9. The apparatus of claim 8, further comprising a slot within said housing whereby said illuminable member light beams are projected from said housing.

10. The apparatus of claim 9, wherein said prism is positioned over the housing slot whereby the light rays from the illuminable member are projected into the prism.

11. The apparatus of claim 10, wherein said prism is located over a section of motor vehicle glass whereby the prism generated spectrum is impinged into the sun visor.

12. The apparatus of claim 11, wherein the generated prism spectrum can be selected varied in wavelength.

13. The apparatus of claim 12, wherein said generated prism spectrum is a product of the housing source light and incorporated prism.

14. The apparatus of claim 13, wherein said light source is comprised of a plurality of illuminable elements for generating a beam projected into a prism for generating a spectrum wavelength.

* * * * *